(12) United States Patent
Sato

(10) Patent No.: US 8,934,728 B2
(45) Date of Patent: Jan. 13, 2015

(54) IMAGE DISPLAY SYSTEM, IMAGE COMPOSING AND RE-ENCODING APPARATUS, IMAGE DISPLAY APPARATUS, METHOD OF DISPLAYING IMAGE, AND COMPUTER-READABLE STORAGE MEDIUM HAVING STORED THEREIN IMAGE COMPOSING AND RE-ENCODING PROGRAM

(71) Applicant: Panasonic Corporation, Osaka (JP)

(72) Inventor: Masaki Sato, Tokyo (JP)

(73) Assignee: Panasonic Corporation, Osaka (JP)

( * ) Notice: Subject to any disclaimer, the term of this patent is extended or adjusted under 35 U.S.C. 154(b) by 76 days.

(21) Appl. No.: 13/900,855

(22) Filed: May 23, 2013

(65) Prior Publication Data

US 2013/0330011 A1    Dec. 12, 2013

(30) Foreign Application Priority Data

Jun. 12, 2012 (JP) .................................. 2012-132777

(51) Int. Cl.
*G06K 9/36* (2006.01)
*G06K 9/46* (2006.01)
*G06T 9/00* (2006.01)

(52) U.S. Cl.
CPC ........................................ *G06T 9/00* (2013.01)
USPC .......................................... 382/232; 382/233

(58) Field of Classification Search
USPC .......................................... 382/232, 233, 284
See application file for complete search history.

(56) References Cited

U.S. PATENT DOCUMENTS

| 7,653,251 | B2 * | 1/2010 | Dei et al. ..................... 382/232 |
| 2004/0111526 | A1 * | 6/2004 | Baldwin et al. .............. 709/231 |
| 2005/0008240 | A1 * | 1/2005 | Banerji et al. ............... 382/238 |
| 2013/0246576 | A1 * | 9/2013 | Wogsberg et al. ........... 709/219 |

FOREIGN PATENT DOCUMENTS

JP    2009-021983    1/2009

* cited by examiner

*Primary Examiner* — Phuoc Tran
(74) *Attorney, Agent, or Firm* — Greenblum & Bernstein, P.L.C.

(57) ABSTRACT

In a case where image data of a part of cameras is delayed, an image composing and re-encoding apparatus of an image display system generates and re-encodes incomplete composed image data in which a part of slices is absent and then transmits the incomplete composed image data. Then, when delayed image data is received from any one of the cameras, the image composing and re-encoding apparatus re-encodes and transmits the delayed image data alone. In a case where the incomplete composed image data is received, when the delayed image data is received thereafter, an image display apparatus generates complemented composed image data by complementing the image data. On the other hand, when the delayed image data is not received, complemented composed image data is generated by complementing the absent slice with past image data.

14 Claims, 11 Drawing Sheets

IMAGE DISPLAY SYSTEM, IMAGE COMPOSING AND RE-ENCODING APPARATUS, IMAGE DISPLAY APPARATUS, METHOD OF DISPLAYING IMAGE, AND COMPUTER-READABLE STORAGE MEDIUM HAVING STORED THEREIN IMAGE COMPOSING AND RE-ENCODING PROGRAM

CROSS REFERENCE TO RELATED APPLICATION

This application claims the benefit of Japanese Patent Application No. 2012-132777 filed on Jun. 12, 2012, and the content of the application is incorporated herein by reference.

BACKGROUND

1. Technical Field

The present technology relates to an image display system, an image composing and re-encoding apparatus, an image display apparatus, a method of displaying an image, and a computer-readable storage medium having stored therein an image composing and re-encoding program that compose a plurality of images captured by a plurality of cameras and display a composed image.

2. Related Art

Generally, image display systems are known which compose a plurality of images captured by a plurality of cameras and display a composed image. According to such an image display system, for example, by generating a composed image in which images captured by four cameras are aligned vertically and horizontally, the four images captured by the four cameras can be displayed altogether as one image.

In JP 2009-21983 A, as such an image display system, a monitoring image recording apparatus for the purpose of reducing a difference in the response time by improving responsiveness at the time of reproducing multiple screens is disclosed. FIG. 10 is a block diagram that illustrates the configuration of the monitoring image recording apparatus. The monitoring image recording apparatus 10 includes a network interface 11, MPEG decoders 12a to 12d, memories 13a to 13d, H.264 encoders 14a to 14d, an image recognizing unit 15, an encoding control unit 16, a recording control unit 17, a recording device 18, H.264 decoders 19a to 19d, and a composition unit 20.

Encoded streams of images of a plurality of channels that are captured and encoded by a plurality of cameras 1a to 1d are transmitted to the monitoring image recording apparatus 10 through a network 2. The network interface 11 of the monitoring image recording apparatus 10 distributes the encoded streams to the MPEG decoders 12a to 12d corresponding to respective channels (cameras). The MPEG decoders 12a to 12d decode the encoded streams of the channels, temporarily stores decoded images in the memories 13a to 13d, and transmit the decoded images to the image recognizing unit 15 that determines the occurrence of an event by performing image recognition of decoded images. The image recognizing unit 15 performs motion detection and face detection by taking a background difference, determines whether an event occurs in an image, and outputs event information relating to the occurrence of the event.

In this monitoring image recording apparatus 10, a group of pictures (GOP) included in the encoded stream is used as a constituent unit of a moving image. A start frame and an end frame of the GOP are defined based on information of a GOP start position and a GOP size. The encoding control unit 16 receives the occurrence of an even that has been determined by the image recognizing unit 15, generates encoding information that includes the GOP start position, the GOP size, and a re-coded rate based on event information, and outputs the generated encoding information.

The H.264 encoders 14a to 14d encode the decoded images of respective channels stored in the memories 13a to 13d based on the encoding information of the encoding control unit 16 and outputs re-encoded streams. Here, in the encoding information that is generated and output by the encoding control unit 16, the GOP start positions and the GOP sizes are determined such that the H.264 encoders 14a to 14d perform re-encoding in a state in which the GOP sizes and the start positions of all the channels are uniformized in accordance with the occurrence of an event.

The recording control unit 17 generates a management table including the event information and the encoding information as image management information used for managing the re-encoded streams and the event information transmitted from the image recognizing unit 15 altogether and records the re-encoded streams in the recording device 18 in association with the image management information based on the management table.

In a case where an image recorded in the recording device 18 is reproduced, and more particularly, in a case where a plurality of images are reproduced, the recording control unit 17 reads the re-encoded streams of respective channels corresponding to the event from the recording device 18 by referring to the image management information of the management table. Then, the re-encoded streams of the respective channels are decoded by the H.264 decoders 19a to 19d, a multi-screen composing process is performed by the composition unit 20, and resultant images are output. From this, recorded images are displayed on multi-screens in a monitoring monitor 3. In other words, images of four moving images of channels a, b, c, and d can be displayed as multiple screens on one display screen.

Particularly, in the monitoring image recording apparatus 10, start frames and end frames of the GOPs of the moving images of a plurality of channels are determined by the encoding control unit 16 based on the event information relating to the occurrence of an event and apparatus setting information, and the start points of the GOPs of the re-encoding streams are uniformized for a plurality of channels by the H.264 encoders 14a to 14d, and the re-encoding streams are re-encoded.

FIG. 11A is a diagram that illustrates the configuration of encoding streams of respective channels in a case where the sizes and the start positions of GOPs are not uniformized, and FIG. 11B is a diagram that illustrates the configuration of encoding streams of respective channels in a case where the sizes and the start positions of GOPs are uniformized. As illustrated in FIG. 11B, in a case where an event occurs, the sizes and the start positions of GOPs can be uniformized in accordance therewith, and accordingly, a difference in the response time at the time of multi-screen reproduction can be reduced.

However, in a case where the conventional image display system described above is applied to an image display system that composes a plurality of pieces of image data received from a plurality of cameras through a wireless network, re-encodes a composed image, transmits the re-encoded composed image to an image display apparatus, and displays the composed image decoded by the image display apparatus in real time, there is a case where composition and re-encoding as described above may not be realized due to transmission fluctuations in wireless communication.

SUMMARY

The present technology is contrived in consideration of the above-described problem, and an object thereof is to provide an image display system, an image composing and re-encoding apparatus, an image display apparatus, a method of displaying an image, and a computer-readable storage medium having stored therein an image composing and re-encoding program that solve a transmission fluctuation problem in wireless communication and reduce a delay of a display image in an image display system that composes a plurality of pieces of image data received from a plurality of cameras through a wireless network, re-encodes a composed image, transmits the encoded composed image to an image display apparatus, and displays the composed image decoded by the image display apparatus in real time.

An image composing and re-encoding apparatus includes: a reception unit that receives encoded image data transmitted from each of a plurality of imaging apparatuses respectively in a wireless manner; a decoding unit that decodes each of a plurality of pieces of the encoded image data received by the reception unit; an image composing unit that generates composed image data by composing the plurality of pieces of the image data decoded by the decoding unit; a re-encoding unit that generates re-encoded composed image data by re-encoding the composed image data; and a transmission unit that transmits the re-encoded composed image data. The image composing unit generates the composed image data in which a part is absent in a case where image data of a part of imaging apparatuses out of the plurality of imaging apparatuses is absent. The re-encoding unit generates re-encoded partial image data by re-encoding delayed image data when the absent image data is input with a delay. The transmission unit transmits the re-encoded partial image data.

An image display apparatus has a configuration including: a reception unit that receives re-encoded composed image data generated by composing and encoding image data of a plurality of imaging apparatuses and re-encoded partial image data generated by encoding delayed image data; a composed image decoding unit that generates composed image data by decoding the re-encoded composed image data; a partial image decoding unit that generates partial image data by decoding the re-encoded partial image data; an image complementing and composing unit that generates complemented composed image data by composing the composed image data and the partial image data corresponding to an absent part in a case where the composed image data is composed image data in which the part is absent; and a display unit that displays the composed image data in which there is no absent part or the complemented composed image data.

An image display system has a configuration including: the above-described image composing and re-encoding apparatus; the above-described image display apparatus; and a plurality of imaging apparatuses.

There is provided a method of displaying an image in an image display system that includes a plurality of imaging apparatuses, an image composing and re-encoding apparatus, and an image display apparatus. The method includes: capturing images by using each of the plurality of imaging apparatuses; generating encoded image data by encoding the image captured in the capturing of images by using each of the plurality of imaging apparatuses; transmitting the encoded image data in a wireless manner by using each of the plurality of imaging apparatuses; receiving a plurality of pieces of the encoded image data transmitted from each of a plurality of cameras in a wireless manner by using the image composing and re-encoding apparatus; decoding the plurality of pieces of the encoded image data received in the receiving of a plurality of pieces of the encoded image data by using the image composing and re-encoding apparatus; generating composed image data in which a part is absent by composing the plurality of pieces of the image data decoded in the decoding of the plurality of pieces of the encoded image data in a case where the image data of a part of the imaging apparatuses out of the plurality of imaging apparatuses is absent by using the image composing and re-encoding apparatus; generating re-encoded composed image data by re-encoding the composed image data generated in the generating of composed image data by using the image composing and re-encoding apparatus; generating re-encoded partial image data by re-encoding delayed image data when the absent image data is input with a delay by using the image composing and re-encoding apparatus; transmitting the re-encoded composed image data by using the image composing and re-encoding apparatus; transmitting the re-encoded partial image data by using the image composing and re-encoding apparatus; receiving the re-encoded composed image data by using the image display apparatus; receiving the re-encoded partial image data by using the image display apparatus; generating partial image data by decoding the re-encoded partial image data by using the image display apparatus; generating complemented composed image data by composing the composed image data and the partial image data corresponding to the absent part by using the image display apparatus; and displaying the complemented composed image data generated in the generating of complemented composed image data.

A method of composing and re-encoding an image includes: receiving a plurality of piece of encoded image data transmitted from each of a plurality of imaging apparatuses respectively in a wireless manner; decoding each of a plurality of pieces of the encoded image data received in the receiving of the plurality of piece of the encoded image data; generating composed image data in which a part is absent by composing the plurality of pieces of the image data decoded in the decoding of a plurality of pieces of the encoded image data in a case where the image data of a part of the imaging apparatuses out of the plurality of imaging apparatuses is absent; generating re-encoded composed image data by re-encoding the composed image data generated in the generating of composed image data; generating re-encoded partial image data by re-encoding delayed image data when the absent image data is input with a delay; transmitting the re-encoded composed image data; and transmitting the re-encoded partial image data.

A computer-readable storage medium having stored therein an image composing and re-encoding program allows a computer to serve as: a reception unit that receives a plurality of pieces of encoded image data transmitted from each of a plurality of imaging apparatuses respectively in a wireless manner; a decoding unit that decodes each of the plurality of pieces of the encoded image data received by the reception unit; an image composing unit that generates composed image data by composing the plurality of pieces of the image data decoded by the decoding unit; a re-encoding unit that generates re-encoded composed image data by re-encoding the composed image data; and a transmission unit that transmits the re-encoded composed image data. The image composing unit generates the composed image data in which a part is absent in a case where the image data of a part of imaging apparatuses out of the plurality of imaging apparatuses is absent. The re-encoding unit generates re-encoded partial image data by re-encoding delayed image data when the absent image data is input with a delay. The transmission unit transmits the re-encoded partial image data.

According to the present technology, in a case where image data of some of a plurality of cameras is absent, re-encoded composed image data in which a part is absent is generated and transmitted, and, when the absent image data is input with a delay, the delayed image data is re-encoded, and the re-encoded partial image data is generated and transmitted. Accordingly, the composed image data can be transmitted to an image display apparatus without a long fluctuation allowable time being set (or with little fluctuation allowable time).

As described below, there is another aspect in the present technology. Thus, the disclosure of this technology is for purposes of providing a part of the present technology but nor for purposes of limiting the technical scope that is described and claimed here.

DETAILED DESCRIPTION

Figure 1:
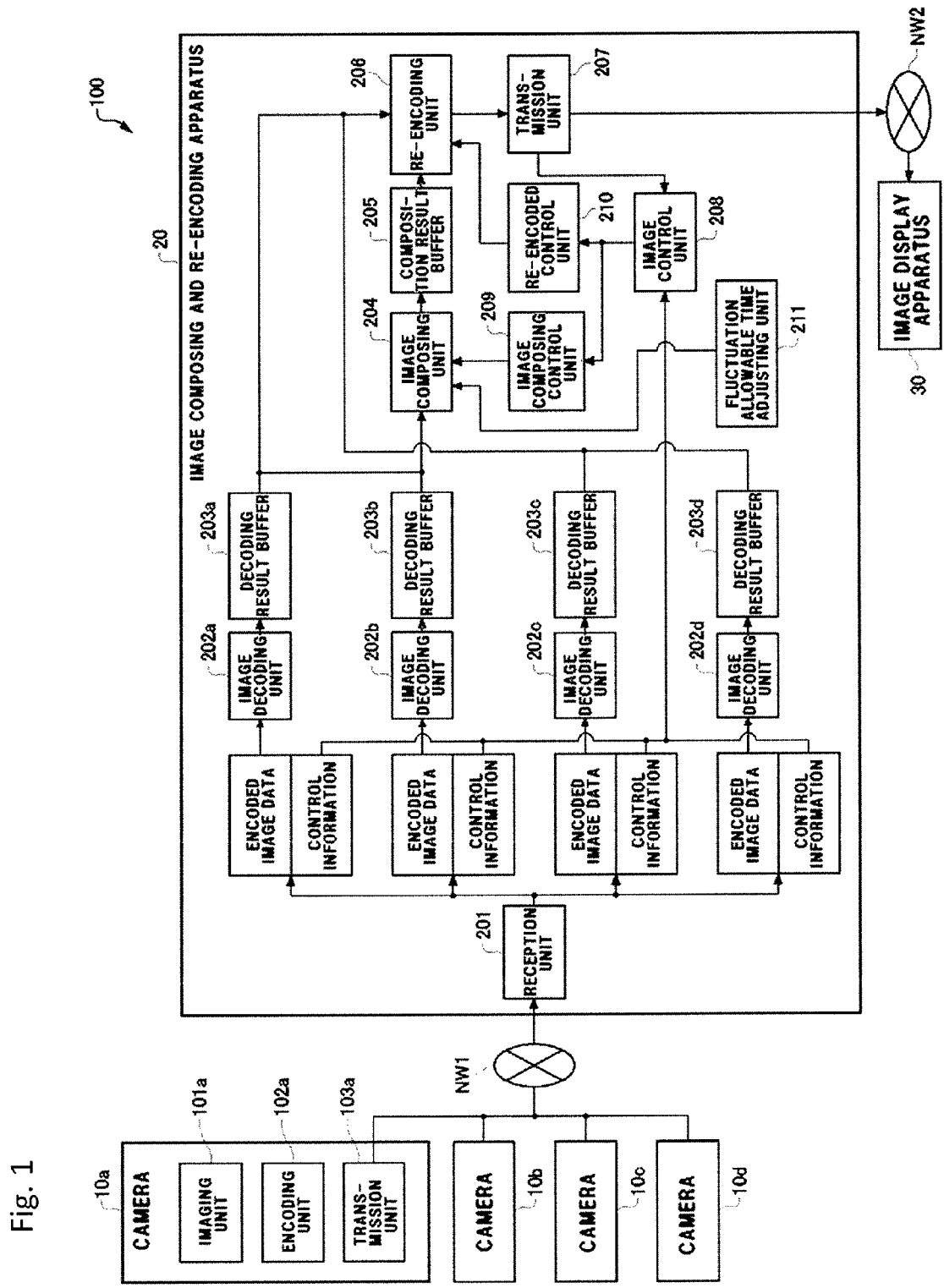
FIG. 1 is a block diagram that illustrates the configuration of an image display system according to an embodiment.

Hereinafter, the present technology will be described in detail. Embodiments described below are merely examples of the present technology, and the present technology may be changed to various forms. Thus, specific configurations and specific functions disclosed here are not for purposes of limiting the claims.

An image composing and re-encoding apparatus includes: a reception unit that receives encoded image data transmitted from each of a plurality of imaging apparatuses respectively in a wireless manner; a decoding unit that decodes each of a plurality of pieces of the encoded image data received by the reception unit; an image composing unit that generates composed image data by composing the plurality of pieces of the image data decoded by the decoding unit; a re-encoding unit that generates re-encoded composed image data by re-encoding the composed image data; and a transmission unit that transmits the re-encoded composed image data. The image composing unit generates the composed image data in which a part is absent in a case where image data of a part of imaging apparatuses out of the plurality of imaging apparatuses is absent. The re-encoding unit generates re-encoded partial image data by re-encoding delayed image data when the absent image data is input with a delay, and the transmission unit transmits the re-encoded partial image data.

According to such a configuration, in a case where image data of some of a plurality of imaging apparatuses is absent, re-encoded composed image data in which a part is absent is generated and transmitted, and, when the absent image data is input with a delay, the delayed image data is re-encoded. The re-encoded partial image data is generated and transmitted. Accordingly, the composed image data can be transmitted to the image display apparatus without a long fluctuation allowable time being set (or with little fluctuation allowable time).

In the above-described image composing and re-encoding apparatus, the image composing unit may generate the composed image data in which a plurality of pieces of image data of the plurality of imaging apparatuses are divided into slices.

According to such a configuration, since the composed image data in which a plurality of pieces of image data of a plurality of imaging apparatuses are divided into slices is generated, the image display apparatus can independently decode the image data of each camera.

In the above-described image composing and re-encoding apparatus, the image composing unit may generate the composed image data in which the image data of a part of the imaging apparatuses is absent in a case where all the image data of the plurality of imaging apparatuses is not collected within a predetermined fluctuation allowable time.

According to such a configuration, the delay of the transmission of the image data from the imaging apparatus to the image composing and re-encoding apparatus can be allowed to be only the fluctuation allowable time. However, according to the above-described configuration, in a case where there is absence in the image data, since the image composing unit generates the composed image data in which a part is absent, the fluctuation allowable time can be set to be relatively short, and the delay of the image display can be decreased in accordance with the setting.

In the above-described image composing and re-encoding apparatus, the fluctuation allowable time may be set to be changeable.

According to such a configuration, the adjustment of the accuracy of an image and the allowable delayed time can be arbitrarily performed.

In the above-described image composing and re-encoding apparatus, the image composing unit may compose a plurality of pieces of image data by reducing each of the plurality of pieces of image data and/or cutting high-frequency components of each of the plurality of pieces of image data based on degrees of importance of each of the plurality of pieces of image data and/or inclusion/no-inclusion of a person in each of the plurality of pieces of image data.

According to such a configuration, the reduction rate or the degree of cutting high-frequency components at the time of performing image composition can be set for each image data of each imaging apparatus.

In the above-described image composing and re-encoding apparatus, the re-encoding unit may encode the composed image data at a coded rate that is based on degrees of importance of each of the plurality of pieces of image data and/or inclusion/no-inclusion of a person in each of the plurality of pieces of image data.

According to such a configuration, the coded rate at the time of performing re-encoding can be set for each piece of the image data of each camera.

In the above-described image composing and re-encoding apparatus, the re-encoding unit may encode the composed image data at a coded rate that is based on a transmission state of a network by which the transmission unit of the image composing and re-encoding apparatus transmits the re-encoded composed image data.

According to such a configuration, a flexible countermeasure in which data is compressed by increasing the coded rate in a case where the transmission state of the network is bad or the like can be performed.

An image display apparatus includes: a reception unit that receives re-encoded composed image data generated by composing and encoding image data of a plurality of imaging apparatuses and re-encoded partial image data generated by encoding delayed image data; a composed image decoding unit that generates composed image data by decoding the re-encoded composed image data; a partial image decoding unit that generates partial image data by decoding the re-encoded partial image data; an image complementing and composing unit that generates complemented composed image data by composing the composed image data and the partial image data corresponding to an absent part in a case where the composed image data is composed image data in which the part is absent; and a display unit that displays the composed image data in which there is no absent part or the complemented composed image data.

In addition, according to such a configuration, when complete re-encoded composed image data is received, the complete re-encoded composed image data can be directly decoded and displayed. On the other hand, in a case where re-encoded composed image data in which apart is absent is received, when re-encoded partial image data corresponding to a delayed and absent part is received, complemented composed image data can be displayed by composing the composed image data and the partial image data.

In the above-described image display apparatus, the image complementing and composing unit, in a case where a part is absent in the composed image data and there is no partial image data corresponding to the absent part, may generate the complemented composed image data by composing past image data in the absent part of the composed image data.

According to such a configuration, in a case where the partial image data that is absent in the composed image data is in transit, since the absent part is complemented with past image data, even when the composed image data is generated and transmitted with a part being absent by the image composing and re-encoding apparatus, there is no case where a composed image in which a part is absent is displayed as a displayed composed image.

An image display system includes: the above-described image composing and re-encoding apparatus; the above-described image display apparatus; and a plurality of imaging apparatuses.

In addition, according to such a configuration, in a case where image data of some of a plurality of imaging apparatuses is absent, re-encoded composed image data in which a part is absent is generated and transmitted, and, when the absent image data is input with a delay, the delayed image data is re-encoded, and the re-encoded partial image data is generated and transmitted. Accordingly, the composed image data can be transmitted to the image display apparatus without a long fluctuation allowable time being set (or with little fluctuation allowable time).

There is provided a method of displaying an image in an image display system that includes a plurality of imaging apparatuses, an image composing and re-encoding apparatus, and an image display apparatus. The method includes: capturing images by using each of the plurality of imaging apparatuses; generating encoded image data by encoding the image captured in the capturing of images by using each of the plurality of imaging apparatuses; transmitting the encoded image data in a wireless manner by using each of the plurality of imaging apparatuses; receiving a plurality of pieces of the encoded image data transmitted from each of the plurality of imaging apparatuses respectively in a wireless manner by using the image composing and re-encoding apparatus; decoding the plurality of pieces of the encoded image data received in the receiving of a plurality of pieces of the encoded image data by using the image composing and re-encoding apparatus; generating composed image data in which a part is absent by composing a plurality of pieces of image data decoded in the decoding of the plurality of pieces of the encoded image data in a case where the image data of a part of the imaging apparatuses out of the plurality of imaging apparatuses is absent by using the image composing and re-encoding apparatus; generating re-encoded composed image data by re-encoding the composed image data generated in the generating of composed image data by using the image composing and re-encoding apparatus; generating re-encoded partial image data by re-encoding delayed image data when the absent image data is input with a delay by using the image composing and re-encoding apparatus; transmitting the re-encoded composed image data by using the image composing and re-encoding apparatus; transmitting the re-encoded partial image data by using the image composing and re-encoding apparatus; receiving the re-encoded composed image data by using the image display apparatus; receiving the re-encoded partial image data by using the image display apparatus; generating partial image data by decoding the re-encoded partial image data by using the image display apparatus; generating complemented composed image data by composing the composed image data and the partial image data corresponding to the absent part by using the image display apparatus; and displaying the complemented composed image data generated in the generating of complemented composed image data by using the image display apparatus.

In addition, according to such a configuration, in a case where image data of some of a plurality of imaging apparatuses is absent, re-encoded composed image data in which a part is absent is generated and transmitted, and, when the absent image data is input with a delay, the delayed image data is re-encoded, and the re-encoded partial image data is generated and transmitted. Accordingly, the composed image data can be transmitted to the image display apparatus without a long fluctuation allowable time being set (or with little fluctuation allowable time).

A method of composing and re-encoding an image includes: receiving a plurality of peace of encoded image data transmitted from each of a plurality of imaging apparatuses respectively in a wireless manner; decoding each of a plurality of pieces of the encoded image data received in the receiving of the plurality of piece of the encoded image data; generating composed image data in which a part is absent by composing a plurality of pieces of image data decoded in the decoding of a plurality of pieces of the encoded image data in a case where the image data of a part of the imaging apparatuses out of the plurality of imaging apparatuses is absent; generating re-encoded composed image data by re-encoding the composed image data generated in the generating of composed image data; generating re-encoded partial image data by re-encoding delayed image data when the absent image data is input with a delay; transmitting the re-encoded composed image data; and transmitting the re-encoded partial image data.

In addition, according to such a configuration, in a case where image data of some of a plurality of imaging apparatuses is absent, re-encoded composed image data in which a part is absent is generated and transmitted, and, when the absent image data is input with a delay, the delayed image data is re-encoded, and the re-encoded partial image data is generated and transmitted. Accordingly, the composed image data can be transmitted to the image display apparatus without a long fluctuation allowable time being set (or with little fluctuation allowable time).

A computer-readable storage medium having stored therein an image composing and re-encoding program allows a computer to serve as: a reception unit that receives a plurality of pieces of encoded image data transmitted from each of a plurality of imaging apparatuses respectively in a wireless manner; a decoding unit that decodes each of the plurality of the encoded image data received by the reception unit; an image composing unit that generates composed image data by composing a plurality of pieces of image data decoded by the decoding unit; a re-encoding unit that generates re-encoded composed image data by re-encoding the composed image data; and a transmission unit that transmits the re-encoded composed image data. The image composing unit generates the composed image data in which a part is absent in a case where the image data of a part of imaging apparatuses out of the plurality of imaging apparatuses is absent. The re-encoding unit generates re-encoded partial image data by re-encoding delayed image data when the absent image data is input with a delay. The transmission unit transmits the re-encoded partial image data.

In addition, according to such a configuration, in a case where image data of some of a plurality of imaging apparatuses is absent, re-encoded composed image data in which a part is absent is generated and transmitted, and, when the absent image data is input with a delay, the delayed image data is re-encoded, and the re-encoded partial image data is generated and transmitted. Accordingly, the composed image data can be transmitted to the image display apparatus without a long fluctuation allowable time being set (or with little fluctuation allowable time).

Hereinbelow, an image display system according to an embodiment will be described with reference to the drawings. FIG. 1 is a block diagram that illustrates the configuration of an image display system according to an embodiment. As illustrated in FIG. 1, the image display system 100 includes cameras 10a to 10d as imaging apparatuses, an image composing and re-encoding apparatus 20, and an image display apparatus 30 as the basic configuration thereof. The cameras 10a to 10d and the image composing and re-encoding apparatus 20 can communicate with each other through a short-range wireless network NW1. The image composing and re-encoding apparatus 20 and the image display apparatus 30 can communicate with each other through a public wireless network NW2. Before a specific configuration of the image display system is described with reference to FIG. 1, an example of the application of the image display system 100 having the above-described basic configuration will be described.

Figure 2:
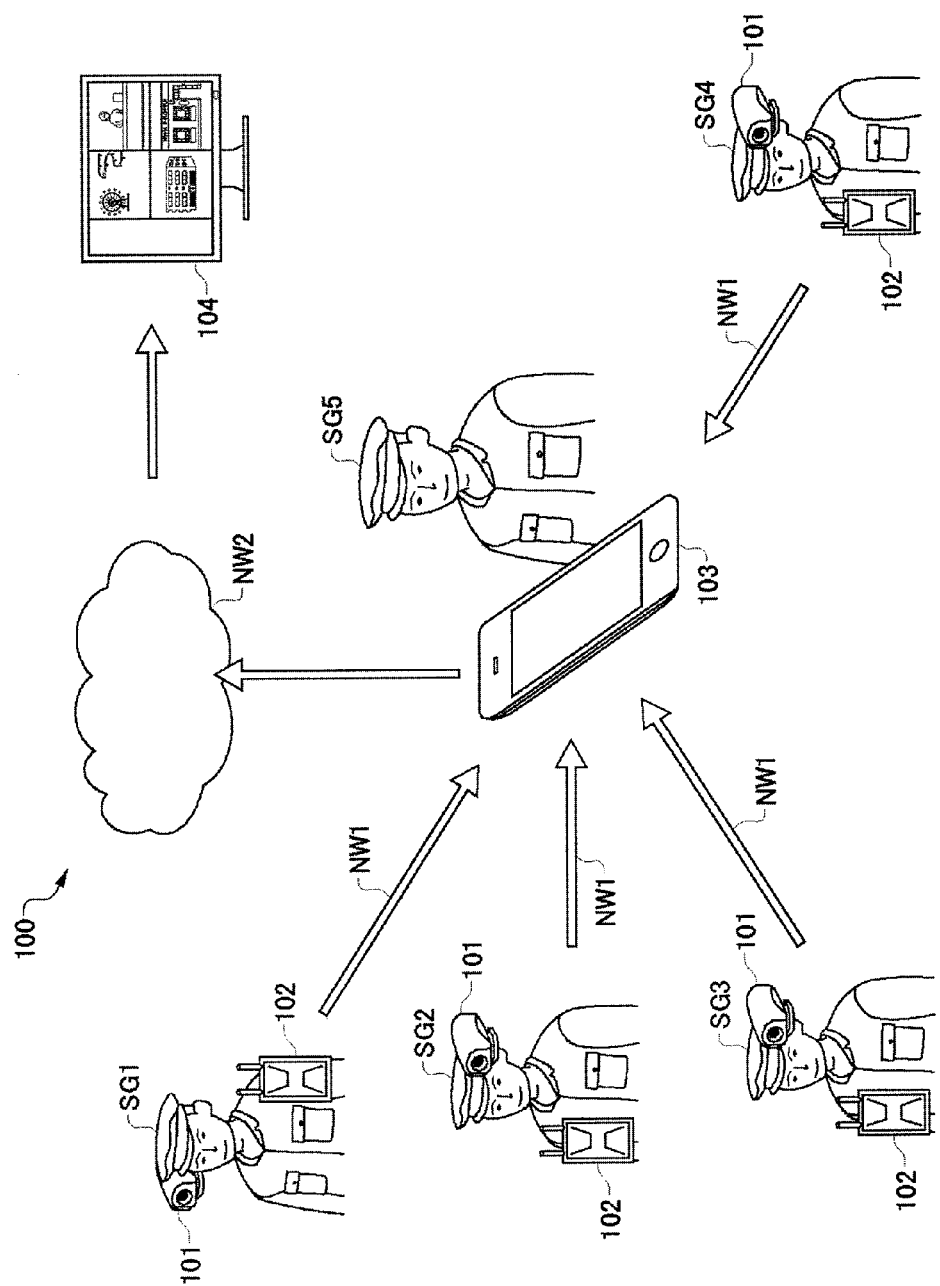
FIG. 2 is a diagram that illustrates an example of the application of an image display system according to an embodiment.

FIG. 2 is a diagram that illustrates an example of the application of the image display system according to this embodiment. In the example illustrated in FIG. 2, the image display system 100 is applied as a system that captures monitoring images used for security and displays the monitoring images. Security guards SG1 to SG4 is equipped with cameras 101 and transmitters 102 used for transmitting images captured by the cameras 101. In addition, a security guard SG5 has a smartphone 103. The cameras 101 are small wearable cameras that can be worn in head portions or the like by the security guards SG1 to SG4. The cameras 101 and the transmitters 102 correspond to the cameras 10a to 10d illustrated in FIG. 1. In addition, the smartphone 103 corresponds to the image composing and re-encoding apparatus 20 illustrated in FIG. 1. Here, the transmitter 102 may be built in the camera 101, or the camera 101 may be built in the transmitter 102. In addition, in a case where the smartphone 103 is configured to have a photographing function and a transmission function, the same smartphones 103 may be carried by all the security guards SG1 to SG5.

Such security guards SG1 to SG5, for example, are arranged in a monitoring target facility such as a department store. The security guards SG1 to SG4 photographs each place of the monitoring target facility using the cameras 101. The image data of each camera 101 is encoded and is transmitted to the smartphone 103 of the security guard SG5 by the transmitter 102. Images are transmitted and received through the short-range wireless network NW1 between the transmitters 102 of the security guards SG1 to SG4 and the smartphone 103 of the security guard SG5. The short-range wireless network NW1, for example, is a WiFi (registered trademark) communication network.

In the smartphone 103, image data acquired by composing images of the cameras 101 and re-encoding a resultant image is generated. The smartphone 103 is connectable to the public wireless network NW2. The public wireless network NW2, for example, is a 3G network or an LTE network. The smartphone 103 transmits the re-encoded composed image data to a viewer terminal 104 through the public wireless network NW2. In the viewer terminal 104, the transmitted re-encoded composed image data is decoded and is displayed. The viewer terminal 104, for example, is located at a place that is geographically far from the monitoring target facility such as a monitoring center.

The reason for arranging images captured by a plurality of cameras 101 as one composed image using the smartphone 103 and then transmitting the composed image to the viewer terminal 104, as described above, is so as to improve the efficiency of network transmission and the image quality. In other words, in a case where images captured by a plurality of cameras 101 are directly transmitted from the cameras 101 to the viewer terminal 104, a control header and the like are added to the data of each image, and accordingly, the transmission efficiency is lowered, and the capacity allocated to an image decreases as that much, whereby the image quality is degraded. Particularly, as described above, in a case where the viewer terminal 104 is located at a place that is far from the cameras 101 (wireless communication cannot be performed in a short-range wireless network), it is necessary to use a public wireless network having a relatively small available bandwidth, and accordingly, in order to transmit image data captured by the cameras to the viewer terminal 104 through such a public wireless network, by arranging a plurality of images as one composed image and transmitting the composed image, the advantages according to the improvements of the network transmission efficiency and the image quality increase. Thus, in the image display system 100 according to this embodiment, images captured by a plurality of cameras 101 are collected in the smartphone 103 once, the images are composed and then encoded, and a composed image is transmitted to the viewer terminal 104.

However, in order to compose the images transmitted from the plurality of cameras 101 in the smartphone 103, it is necessary to receive all the images to be composed in the smartphone 103 from the cameras 101. Since the images are transmitted from the cameras 101 to the smartphone 103 through wireless communication, there are cases where images transmitted from some of the cameras 101 arrive at the smartphone 103 with a delay due to transmission fluctuations in the wireless network. In order to generate a composed image based on such a transmission fluctuation, a method may be considered in which a time for allowing a transmission fluctuation is secured until a composed image is generated after the reception of images from the cameras 101 in the smartphone 103. However, in such a case, a relatively long delay steadily occurs in the image transmitted from the smartphone 103 to the viewer terminal 104. Thus, according to this embodiment, an image display system capable of reducing or eliminating a steady image delay due to a transmission fluctuation allowable time is provided.

Referring to FIG. 1 again, the configuration of the image display system 100 for achieving the above-described object will be described. Regarding the configurations of the cameras 10a to 10d, only the camera 10a is illustrated in the figure, the configuration of each of the cameras 10b to 10d is the same as that of the camera 10a, and illustration and description thereof will not be presented. The camera 10a includes an imaging unit 101a that captures an image, an encoding unit 102a that generates encoded image data by encoding the image captured by the imaging unit 101a, and a transmission unit 103a that transmits the encoded image data in a wireless manner. The transmission unit 103a transmits the encoded image data through the short-range wireless network NW1 that is a WiFi network. To this encoded image data, control information is added. In the control information, information representing the degree of significance of an image and information representing whether or not a person is reflected are included.

The image composing and re-encoding apparatus 20 includes: a reception unit 201; image decoding units 202a to 202d; decoding result buffers 203a to 203d; an image composing unit 204; a composition result buffer 205; a re-encoding unit 206; a transmission unit 207; an image control unit 208; an image composing control unit 209; a re-encoding control unit 210; and a fluctuation allowable time adjusting unit 211. The image composing and re-encoding apparatus 20 is realized by a computer executing an image composing and re-encoding program that is stored in a computer-readable storage medium.

The reception unit 201 receives a plurality of pieces of encoded image data transmitted from the cameras 10a to 10d in a wireless manner and control information added thereto. The encoded image data that has been received by the reception unit 201 is output to corresponding image decoding units 202a to 202d. In other words, the encoded image data of the camera 10a is output to the image decoding unit 202a, the encoded image data of the camera 10b is output to the image decoding unit 202b, the encoded image data of the camera 10c is output to the image decoding unit 202c, and the encoded image data of the camera 10d is output to the image decoding unit 202d.

The image decoding units 202a to 202d decode the encoded image data transmitted from the cameras 10a to 10d received by the reception unit 201. The decoding result buffers 203a to 203d temporarily store the image data decoded by the image decoding units 202a to 202d. On the other hand, all the control information added to the encoded image data received by the reception unit 201 is output to the image control unit 208.

The image data stored in the decoding result buffers 203a to 203d is output to the image composing unit 204 in a case where the image data has been acquired within a predetermined fluctuation allowable time and is directly output to the re-encoding unit 206 in a case where the image data has been acquired with a delay over the fluctuation allowable time. This fluctuation allowable time is changeable and is adjusted by the fluctuation allowable time adjusting unit 211. In other words, the fluctuation allowable time is set in the image composing unit 204 by the fluctuation allowable time adjusting unit 211, and the image composing unit 204 receives image data stored at that time point from the decoding result buffers 203a to 203d at timing when the set fluctuation allowable time elapses. As the fluctuation allowable time, for example, an average of delay times due to transmission fluctuations may be used.

The image composing unit 204 generates composed image data acquired by arranging the a plurality of pieces of image data that have been decoded by the image decoding units 202a to 202d and input from the decoding result buffers 203a to 203d as one image. In this embodiment, the image composing unit 204 generates one composed image by vertically and horizontally arranging four images transmitted from the cameras 10a to 10d. At this time, the image composing unit 204 generates the composed image data in which the data of the plurality of images is divided into slices. The image composing unit 204 composes the images under the control of the image composing control unit 209. The control process performed by the image composing control unit 209 will be described later.

In a case where data of the images transmitted from all the cameras 10a to 10d is acquired in the decoding result buffers 203a to 203d within the fluctuation allowable time, the data of all the images is output to the image composing unit 204, and accordingly, the image composing unit 204 composes the images and generates complete composed image data in which the data of all the images are collected altogether. On the other hand, in a case where a part of the image data transmitted from the cameras 10a to 10d has not been acquired in any one of the decoding result buffers 203a to 203d within the fluctuation allowable time, only acquired image data is output to the image composing unit 204, and accordingly, the image composing unit 204 generates incomplete composed image data in which a part of the slices is absent by using only the received image data. The image composing unit 204 adds image encoding information to the generated composed image data and outputs resultant composed image data. The image encoding information is information that represents whether the composed image data is complete or incomplete and which slice (image data transmitted from a camera) is absent in a case where the composed image data is incomplete.

The composition result buffer 205 temporarily stores the composed image data generated by the image composing unit 204 and outputs the composed image data to the re-encoding unit 206. The re-encoding unit 206 encodes image data in compliance with the H.264 specification. The re-encoding unit 206 re-encodes the composed image data and thereby generating re-encoded composed image data. The re-encoding unit 206 performs re-encoding under the control of the re-encoding control unit 210. The control process performed by the re-encoding control unit 210 will be described later. In addition, in a case where a part of the image data has not been acquired in the decoding result buffers 203a to 203d from any one of the decoding result buffers 203a to 203d within the fluctuation allowable time, when image data that is absent in the incomplete composed image data generated by the image composing unit 204 is received with a delay, the re-encoding unit 206 re-encodes the delayed image data and generates re-encoded single slice image data. This re-encoded single slice image data corresponds to re-encoded partial image data. In addition, in a case where a plurality of pieces of image data is delayed out of a plurality of pieces of image data to be composed by the image composing unit 204, by re-encoding the plurality of image data alone, a plurality of pieces of re-encoded single slice image data are generated.

In a case where the re-encoded single slice image data is generated, the re-encoding unit 206 adds image encoding information thereto and outputs resultant image data to the transmission unit 207. This image encoding information is information that represents which slice of the corresponding incomplete composed image data is complemented by the re-encoded single slice image data.

The transmission unit 207 transmits the re-encoded composed image data and the re-encoded single slice image data generated by the re-encoding unit 206 to the image display apparatus 30 together with the image encoding information through the public wireless network NW2. The public wireless network, for example, is a 3G network, an LTE communication network, or a short-range wireless network other than the short-range wireless network NW1.

Figure 3:
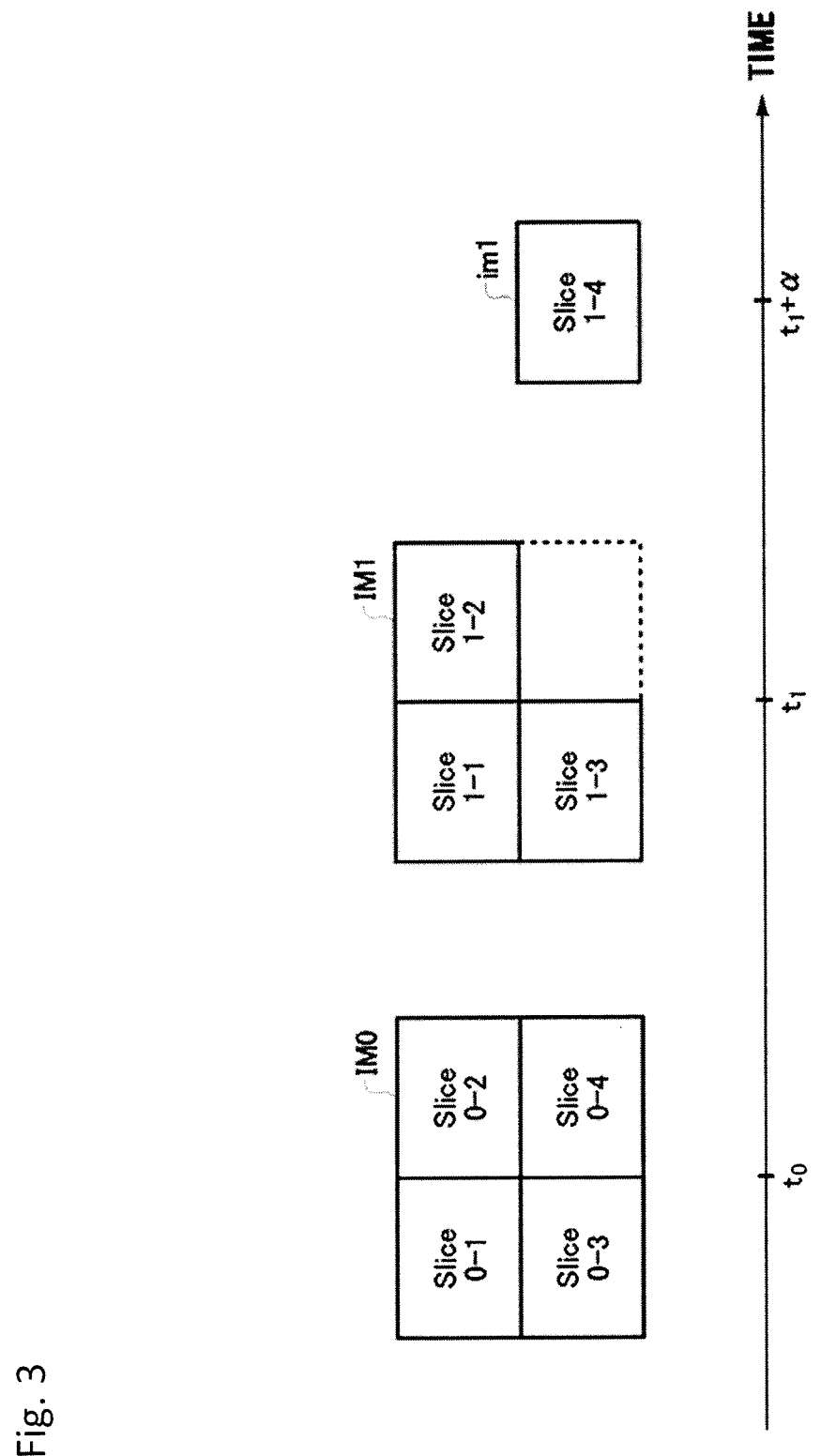
FIG. 3 is a diagram that illustrates composed image data and delayed image data according to an embodiment.

FIG. 3 is a diagram that illustrates the composed image data and the delayed image data. The image composing unit 204, as described above, generates the composed image data acquired by vertically and horizontally arranging the image data transmitted from the cameras 10a to 10d. The image data transmitted from the camera 10a is arranged on the upper left side, the image data transmitted from the camera 10b is arranged on the upper right side, the image data transmitted from the camera 10c is arranged on the lower left side, and the image data transmitted from the camera 10d is arranged on the lower right side. At time $t_0$, all the slices 0-1 to 0-4 that are image data transmitted from the cameras 10a to 10d are collected, and accordingly, complete composed image data IM0 acquired by vertically and horizontally arranging the slices is generated. This composed image data IM0 is encoded by the re-encoding unit 206 and is transmitted from the transmission unit 207.

At time $t_1$, since the image data slice 1-4 transmitted from the camera 10d has not been acquired within the fluctuation allowable time, the image composing unit 204 generates incomplete composed image data IM1 in which the lower right area is vacant. This composed image data IM1 is encoded by the re-encoding unit 206 and is transmitted from the transmission unit 207. When the image data slice 1-4 transmitted from the camera 10d is acquired with a delay at time $t_1+\alpha$, the image data is encoded alone by the re-encoding unit 206 and is transmitted from the transmission unit 207.

Figure 4:
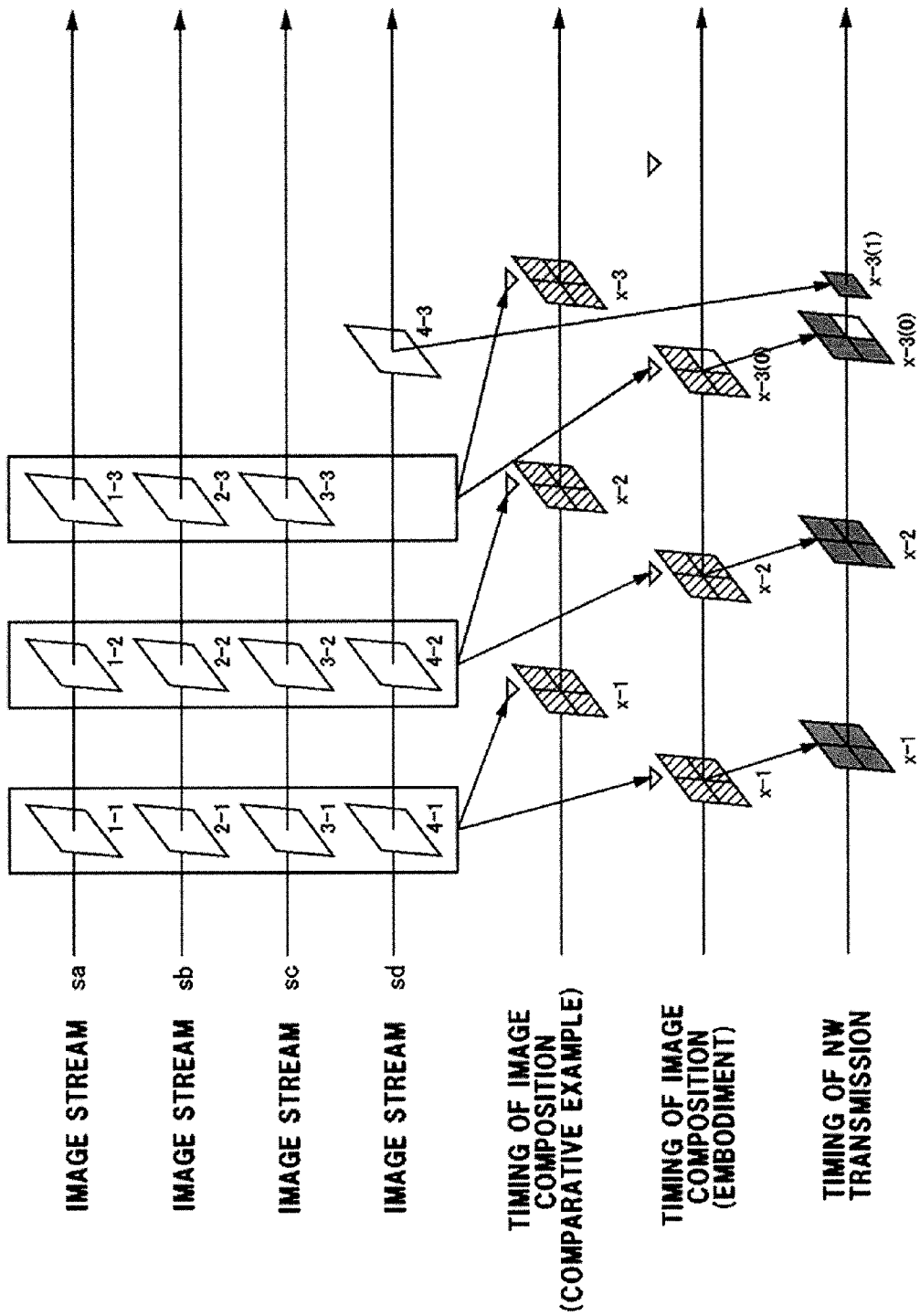
FIG. 4 is a diagram that illustrates timings of image streams input from cameras, image composition, and network transmission according to an embodiment.

FIG. 4 is a diagram that illustrates timings of image streams (streams of encoded image data) input from the cameras 10a to 10d, image composition, and network transmission. The camera 10a sequentially transmits image data 1-1, 1-2, and 1-3 as an image stream sa, and the image data is acquired in this order in the decoding result buffer 203a of the image composing and re-encoding apparatus 20. In addition, the cameras 10b, 10c, and 10d similarly sequentially transmits image data 2-1, 2-2, and 2-3, image data 3-1, 3-2, and 3-3, and image data 4-1, 4-2, and 4-3 as image streams sb, sc, and sd, and the image data is acquired in this order in the decoding result buffers 203b, 203c, and 203d of the image composing and re-encoding apparatus 20. However, the image data 4-3 is acquired with a delay in the decoding result buffer 203d.

As described above, if composed image data is to be generated to necessarily include the delayed image data 4-3, as represented in the timing of image composition (comparative example), image data transmitted from the cameras is composed with a sufficient fluctuation allowable time being secured, whereby composed image data x-1, x-2, and x-3 are generated. In contrast to this, in the case of this embodiment, the fluctuation allowable time may not be arranged, and even in a case where the fluctuation allowable time is set, it can be set to be shorter than that of the comparative example. Accordingly, as is apparent from FIG. 4, the timing of image composition is earlier than that of the comparative example, and the timing of NW transmission is earlier than that of the comparative example, whereby a delay of the image can be reduced.

According to this embodiment, since the fluctuation allowable time is short, image composition is performed before the image data 4-3 is acquired with a delay, and accordingly, the image data 4-3 is absent in the composed image data x-3(0). The image data 4-3 that has not been acquired within the short fluctuation allowable time is encoded at the timing when it is acquired and is transmitted to the public wireless network NW2 as re-encoded single slice image data x-3(1).

Figure 5:
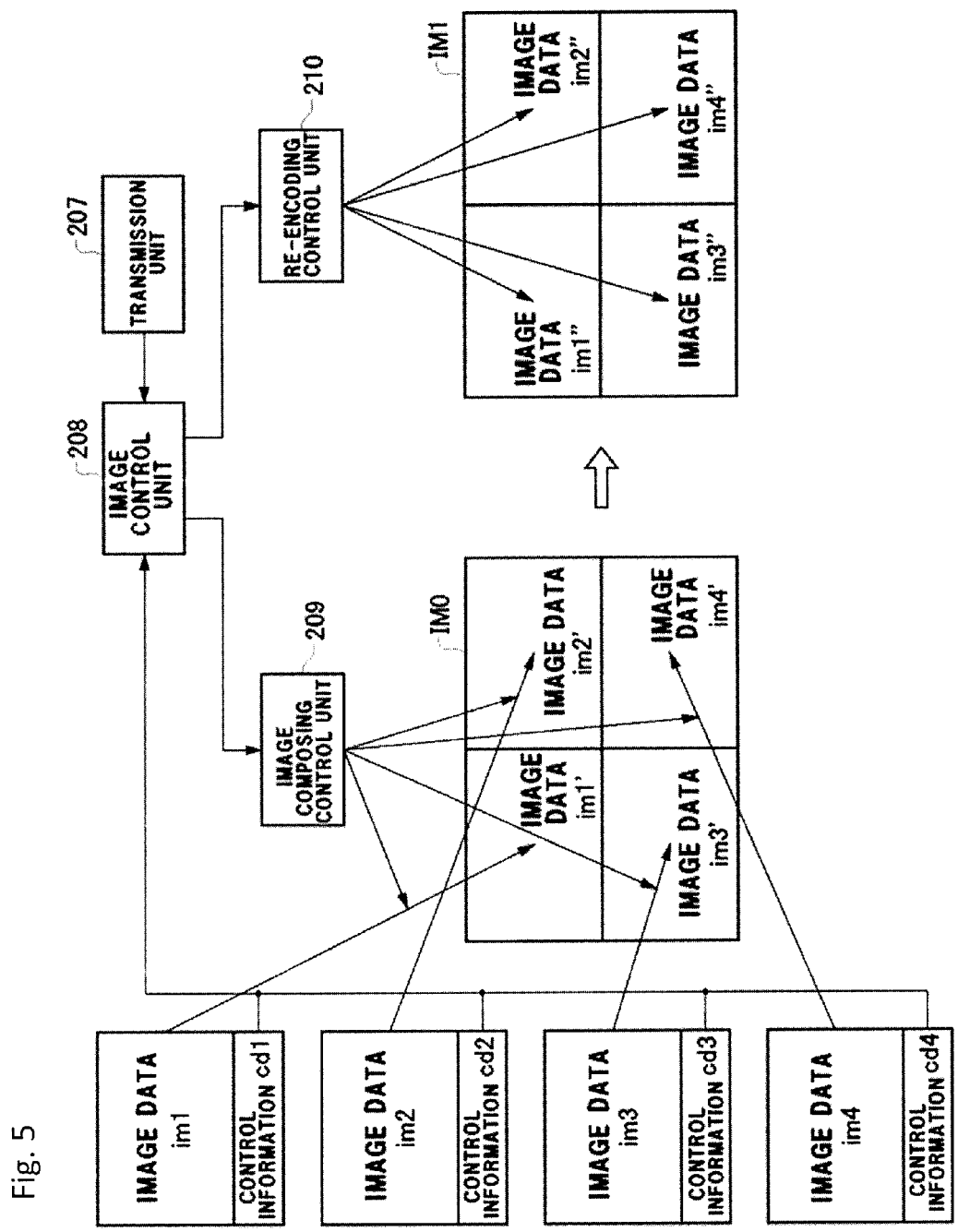
FIG. 5 is a diagram that illustrates control of image composition and control of re-encoding according to an embodiment.

Next, the control of image composition and re-encoding will be described with reference to FIGS. 1 and 5. FIG. 5 is a diagram that illustrates control of image composition and control of re-encoding according to an embodiment. In the example illustrated in FIG. 5, image data acquired from the cameras 10a to 10d are assumed to be image data im1 to im4, and control information added thereto is assumed to be control information cd1 to cd4. The control information cd1 to cd4 (the degree of importance of image data transmitted from each camera and whether a person is included therein) that is added to the image data transmitted from the cameras 10a to 10d and is transmitted is input to the image control unit 208. In addition, the transmission unit 207 acquires transmission state information of the public wireless network NW2 and outputs the transmission state information to the image control unit 208. The image control unit 208 outputs information of the degree of importance and the inclusion/no-inclusion of a person to the image composing control unit 209 and outputs the information of the degree of importance and the inclusion/no-inclusion of a person and the transmission state information to the re-encoding control unit 210. Here, while a case will be described in which the degree of importance is based on the control information transmitted from the camera, a user using the image display apparatus 30 may set the degrees of importance of the cameras 10a to 10d.

While the image data im1 to im4 are divided into slices by the image composing unit 204 and are formed as a composed image data IM1, at this time, the image data im1 to im4 are reduced at reduction rates according to the degrees of importance of the corresponding image data and respective inclusion/no-inclusion of a person therein, which are input to the image composing control unit 209, have high frequency components be cut in accordance with the degrees of importance of the corresponding image data and respective inclusion/no-inclusion of a person therein so as to be image data im1' to im4', and are composed with other image data im1' to im4'. The image data im1 to im4 that are of no importance and have no person reflected therein are reduced to be small and have high frequency components thereof be further cut.

Composed image data IM1 formed from the image data im1' and im4' is encoded to be re-encoded composed image data IM2 by the re-encoding unit 206, and, at this time, in the re-encoded composed image data IM2, the image data im1' to im4' are encoded at coded rates according to the degrees of importance and respective inclusion/no-inclusion of a person therein to be set as image data im1" to im4". More specifically, first, based on the transmission state, a generated total amount of codes of the image data im1" to im4" is acquired such that the generated amount of codes of the composed image data is large in a case where the transmission state is good, and the generated amount of codes of the composed image data is small in a case where the transmission state is bad. Thereafter, based on the degree of importance and the like of each image data, the amount of codes assigned to each image data is determined, and the image data im1' to im4' is encoded so as to have the determined amount of codes.

Figure 6:
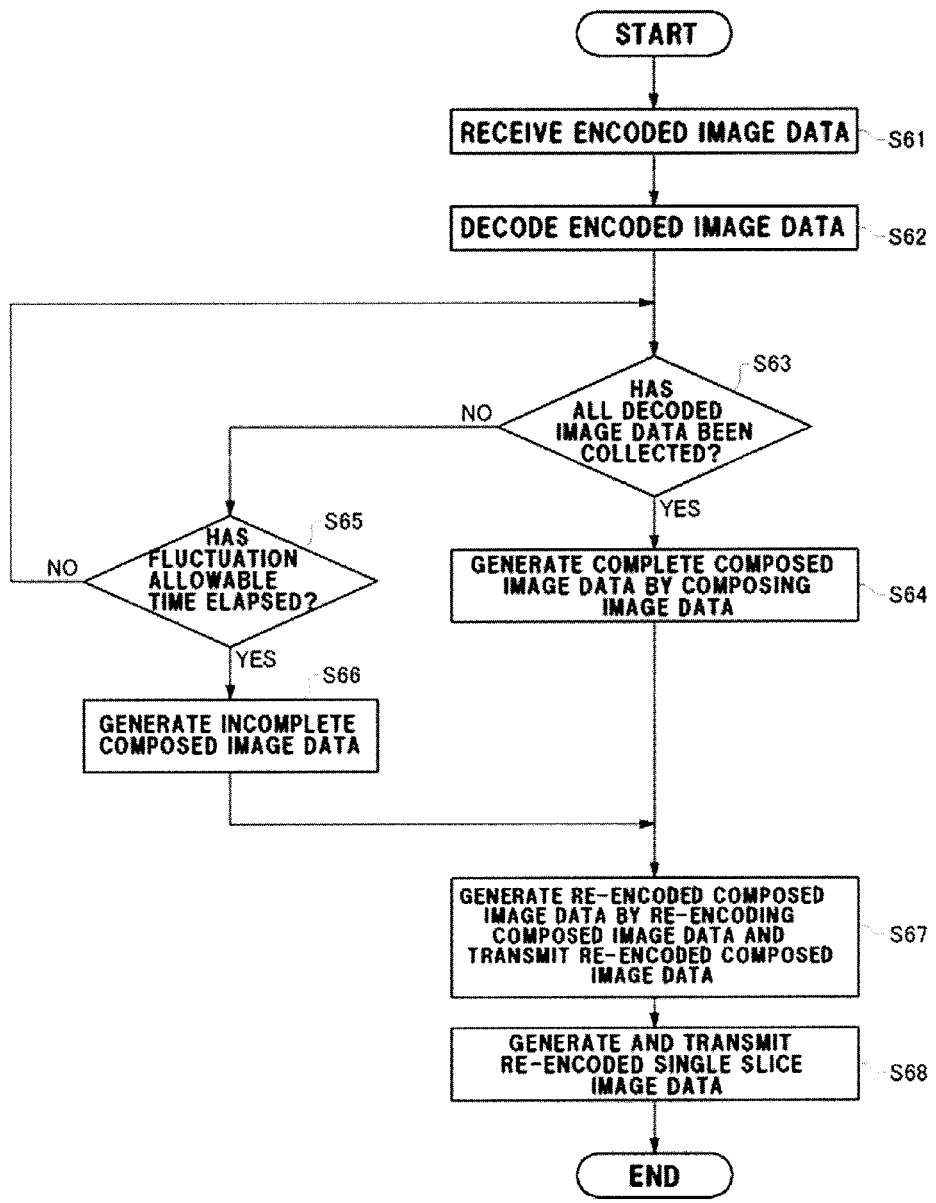
FIG. 6 is a flowchart that illustrates the operation of an image composing and re-encoding apparatus according to an embodiment.

Next, the operation of the image composing and re-encoding apparatus 20 described above will be described. FIG. 6 is a flowchart that illustrates the operation of the image composing and re-encoding apparatus 20. First, the reception unit 201 of the image composing and re-encoding apparatus 20 receives a plurality of pieces of encoded image data that have been transmitted from a plurality of cameras 10a to 10d in a wireless manner in Step S61. Then, the image decoding units 202a to 202d decode the data of the plurality of encoded images that has been received from the reception unit 201 in Step S62.

Next, the image composing unit 204 determines whether or not the data of all the decoded images transmitted from the plurality of cameras 10a to 10d has been collected in Step S63. In a case where the data of all the decoded images has been collected (Yes in Step S63), the data of the plurality of images decoded by the image decoding units 202a to 202d is composed, whereby complete composed image data in which the data of the plurality of images transmitted from the plurality of cameras is divided into slices is generated in Step S64.

On the other hand, in a case where the data of images transmitted from a part of the plurality of cameras is absent (Yes in Step S63), it is determined whether or not the fluctuation allowable time has elapsed in Step S65. Until the fluctuation allowable time elapses (No in Step S65), the determination (Step S63) whether or not the data of all the images has been collected is repeated, and, when the allowable fluctuation time has elapsed (Yes in Step S65) in the state in which the data of all the images has not been collected (not Yes in Step S63), the image composing unit 204 composes only image data that has been acquired, whereby incomplete composed image data in which a part of slices is absent is generated in Step S66.

The re-encoding unit 206 generates re-encoded composed image data by re-encoding the composed image data generated in Step S64 or S66, and the transmission unit 207 transmits the re-encoded composed image data in Step S67.

When the absent image data is input with a delay, the re-encoding unit 206 generates re-encoded single slice image data by re-encoding the delayed image data, and the transmission unit 207 transmits the re-encoded single slice image data in Step S68. Here, Step S68 is unnecessary in a case where there is no re-encoded single slice image data. In addition, as described above, in a case where a plurality of pieces of image data is delayed, the re-encoded single slice image data is generated for the data of each delayed image and is respectively transmitted.

Figure 7:
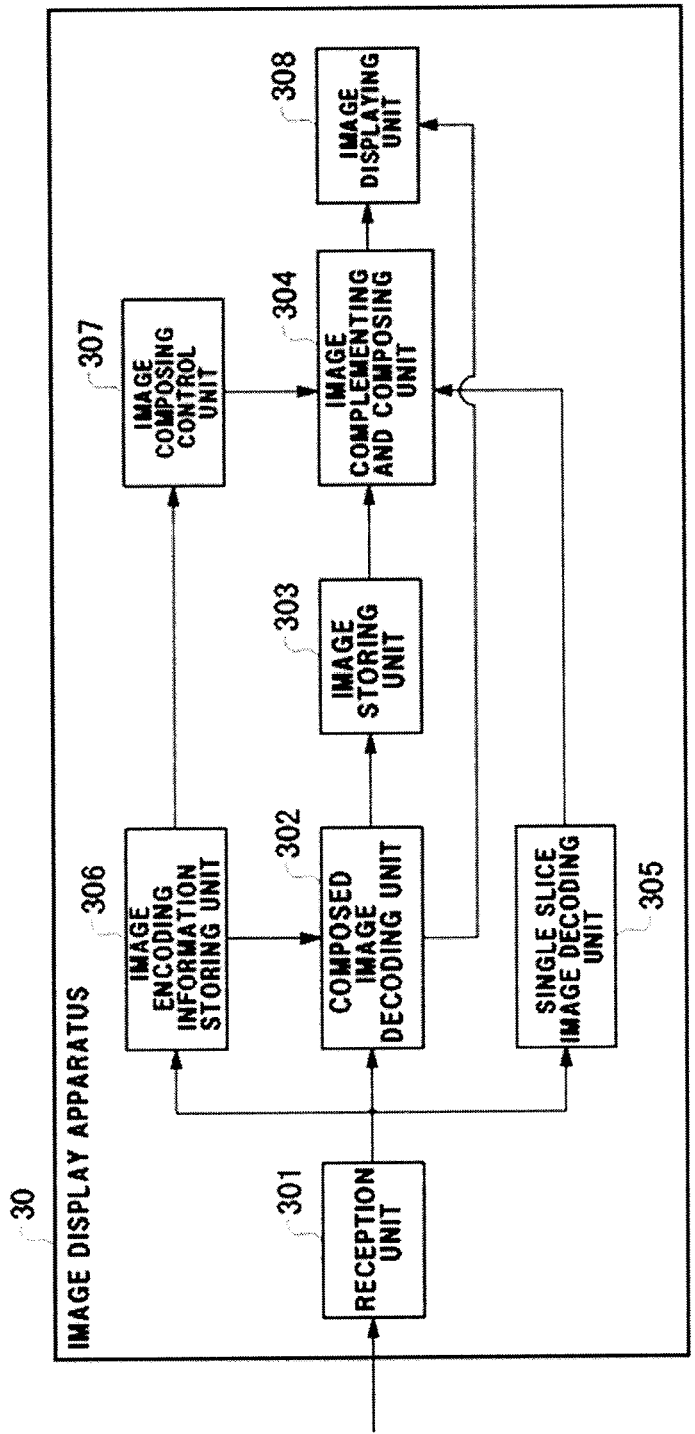
FIG. 7 is a block diagram that illustrates the configuration of an image display apparatus according to an embodiment.

Next, the image display apparatus 30 will be described which receives and displays the re-encoded composed image data and the re-encoded single slice image data transmitted from the image composing and re-encoding apparatus 20. FIG. 7 is a block diagram that illustrates the configuration of the image display apparatus 30. The image display apparatus 30 includes a reception unit 301, a composed image decoding unit 302, an image storing unit 303, an image complementing and composing unit 304, a single slice image decoding unit 305, an image encoding information storing unit 306, an image composing control unit 307, and an image displaying unit 308.

The reception unit 301 receives the re-encoded composed image data and the re-encoded single slice image data transmitted from the image composing and re-encoding apparatus 20 through the public wireless network NW2. The reception unit 301 outputs the re-encoded composed image data to the composed image decoding unit 302, outputs the re-encoded single slice image data to the single slice image decoding unit 305, and outputs the image encoding information added to the re-encoded composed image data and the re-encoded single slice image data to the image encoding information storing unit 306.

The composed image decoding unit 302 generates composed image data by decoding the re-encoded composed image data. In a case where complete composed image data is generated, the composed image decoding unit 302 outputs the complete composed image data to the image storing unit 303 and directly outputs the complete composed image data to the image displaying unit 308. On the other hand, in a case where incomplete composed image data is generated, the composed image decoding unit 302 outputs the incomplete composed image data only to the image storing unit 303.

The single slice image decoding unit 305 generates single slice image data by decoding the re-encoded single slice image data and outputs the single slice image data to the image complementing and composing unit 304. The image encoding information storing unit 306 outputs the image encoding information to the image composing control unit 307. The image complementing and composing unit 304 complements and composes the image under the control of the image composing control unit 307. More specifically, in a case where the re-encoded composed image data received by the reception unit 301 is acquired by re-encoding incomplete composed image data, in other words, in a case where the composed image data decoded by the composed image decoding unit 302 is incomplete composed image data in which a part of slices is absent, the image composing control unit 307, in accordance with the image encoding information, generates complemented composed image data by composing the incomplete composed image data input to the image complementing and composing unit 304 from the composed image decoding unit 302 and the single slice image data, which is input from the single slice image decoding unit 305, corresponding to the absent slices.

In a case where the image composing unit 304 is controlled to receive the incomplete composed image data from the composed image decoding unit 302 and generate complemented composed image data using the image composing control unit 307, when single slice image data that is absent in the incomplete composed image data is not acquired from the single slice image decoding unit 305, the image composing unit 304 acquires past image data from the image storing unit 303 as the image data of that part and composes the past image data with the incomplete composed image data, thereby generating complemented composed image data. The image composing unit 304 waits for the input of the single slice image data of the absent slice from the single slice image decoding unit 305 within a predetermined delay allowable time, and, when the delay allowable time elapses, the image composing unit 304 composes past image data, which is stored in the image storing unit 303, for the part with the incomplete composed image data. In a case where the a plurality of pieces of image data is absent, complemented composition is performed only for a slice of which the single slice image is acquired out of the data of the images using the single slice, and complemented composition using past image data is performed for a slice of which the single slice image is not acquired.

In a case where complete composed image data in which a slice is not absent is input from the composed image decoding unit 302, the image displaying unit 308 displays the complete composed image data. On the other hand, in a case where complemented composed image data is input from the image composing unit 304, the image displaying unit 308 displays the complemented composed image data.

Figure 8:
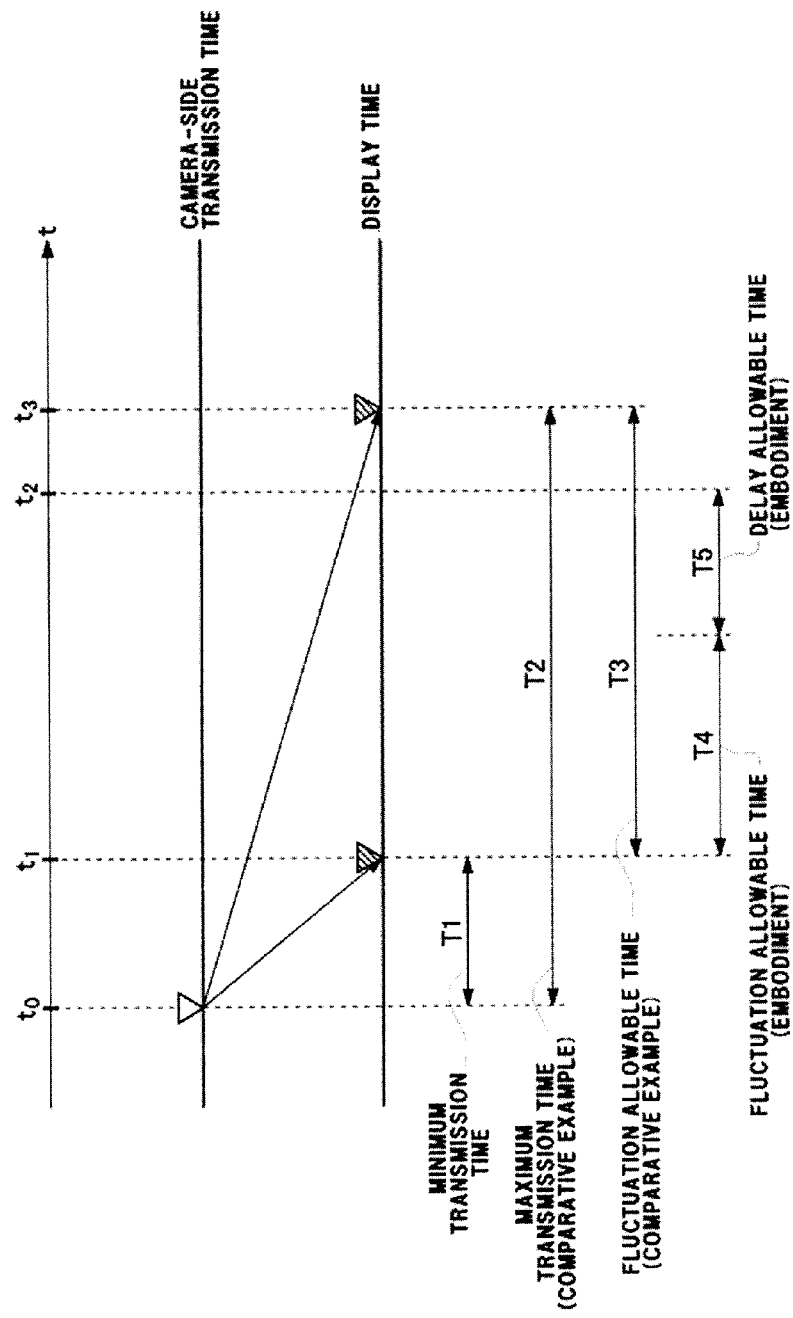
FIG. 8 is a diagram that illustrates a time required for displaying a composed image by using an image display apparatus after image data captured by cameras is transmitted from the cameras to the image composing and re-encoding apparatus according to an embodiment.

FIG. 8 is a diagram that illustrates a time required for a composed image is displayed by the image display apparatus 30 after image data captured by the cameras 10*a* to 10*d* is transmitted from the cameras 10*a* to 10*d* to the image composing and re-encoding apparatus 20. As illustrated with reference to FIG. 4, in a comparative example, a composed image is generated after waiting for image data of which the reception is delayed in the image composing and re-encoding apparatus, and accordingly, in the image composing and re-encoding apparatus, the composition of the image data needs to be performed with a fluctuation allowable time corresponding to a maximum value of a considered transmission fluctuation being secured.

In the image composing and re-encoding apparatus, in a case where input image data is composed and is immediately transmitted without setting a fluctuation allowable time at all, encoded image data transmitted from a camera at time $t_0$ is displayed as a composed image at time $t_1$ after a minimum transmission time T1. In contrast to this, similarly to the comparative example, in a case where a maximum fluctuation allowable time T3 is secured, the composed image is displayed at time $t_3$ that is delayed from time $t_1$ by the fluctuation allowable time T3. As a result, a maximum transmission time T2 (=minimum transmission time T1+fluctuation allowable time T3) is necessary until time $t_3$ when the composed image is displayed from time $t_0$ when the encoded image data is transmitted from the camera.

On the other hand, in the image display system 100 according to this embodiment, the fluctuation allowable time T4 does not need to be set as a maximum value of the delay time due to the considered transmission fluctuation but may be set as a time shorter than the maximum value. Furthermore, the fluctuation allowable time T4 may be set to zero. In addition, as described above, also in the image display apparatus 30, complemented composed image data is generated after waiting for the single slice image data only for a delay allowable time T5. Here, the length of this delay allowable time T5 is arbitrary and may be set to zero. Accordingly, in this embodiment, a total delay time is the fluctuation allowable time T4+the delay allowable time T5, and the lengths of the fluctuation allowable time T4 and the delay allowable time T5 may be arbitrarily set. Therefore, time $t_2$ when the composed image data is displayed may be arbitrarily set and may be set to be earlier than the display time $t_3$ of the comparative example. In a case where both the fluctuation allowable time T4 and the delay allowable time T5 are set to zero, the composed image can be displayed at time $t_1$ that is the earliest.

In addition, a time until single slice image data is decoded (can be complemented) after the incomplete composed image data is decoded in the image display apparatus 30 may be shorter than a delay time until the image data of the absent slice is acquired after the incomplete composed image data in which a part of slices is absent is generated by the image composing and re-encoding apparatus 20 due to the following two factors.

A first factor is that, in the re-encoding unit 206 of the image composing and re-encoding apparatus 20, generally, a time required for re-encoding the single slice image data is shorter than a time required for re-encoding incomplete composed image data, and, also in the image display apparatus 30, generally, a time required for decoding the re-encoded single slice image data is shorter than a time required for decoding the incomplete re-encoded composed image data. A second factor is that, since there is a transmission fluctuation also in the public wireless network NW2, a time required for receiving the re-encoded single slice image data in the image display apparatus 30 after the re-encoded single slice image data is transmitted from the image composing and re-encoding apparatus 20 is shorter than a time required for receiving incomplete re-encoded composed image data in the image display apparatus 30 after the incomplete re-encoded composed image data is transmitted from the image composing and re-encoding apparatus 20.

Accordingly, in a case where the fluctuation allowable time T4 is set to be short and, when image composition is performed by the image composing and re-encoding apparatus 20, incomplete composed image data is generated using image data that has been received without waiting for the delayed image data for a long time and is transmitted first to the image display apparatus 30, even when the delay allowable time T5 is not sufficiently set, complemented composed image data complemented by the delayed single slice image data is generated, and this embodiment is useful. In addition, in this embodiment, in a case where single slice image data cannot be acquired even after the elapse of the delay allowable time T5, as described above, the past image data of the absent slice is composed, and, similarly to the comparative example, in a case where the image data is delayed over the fluctuation allowable time, there is an advantage over a case where the image of the corresponding part cannot be displayed.

Figure 9:
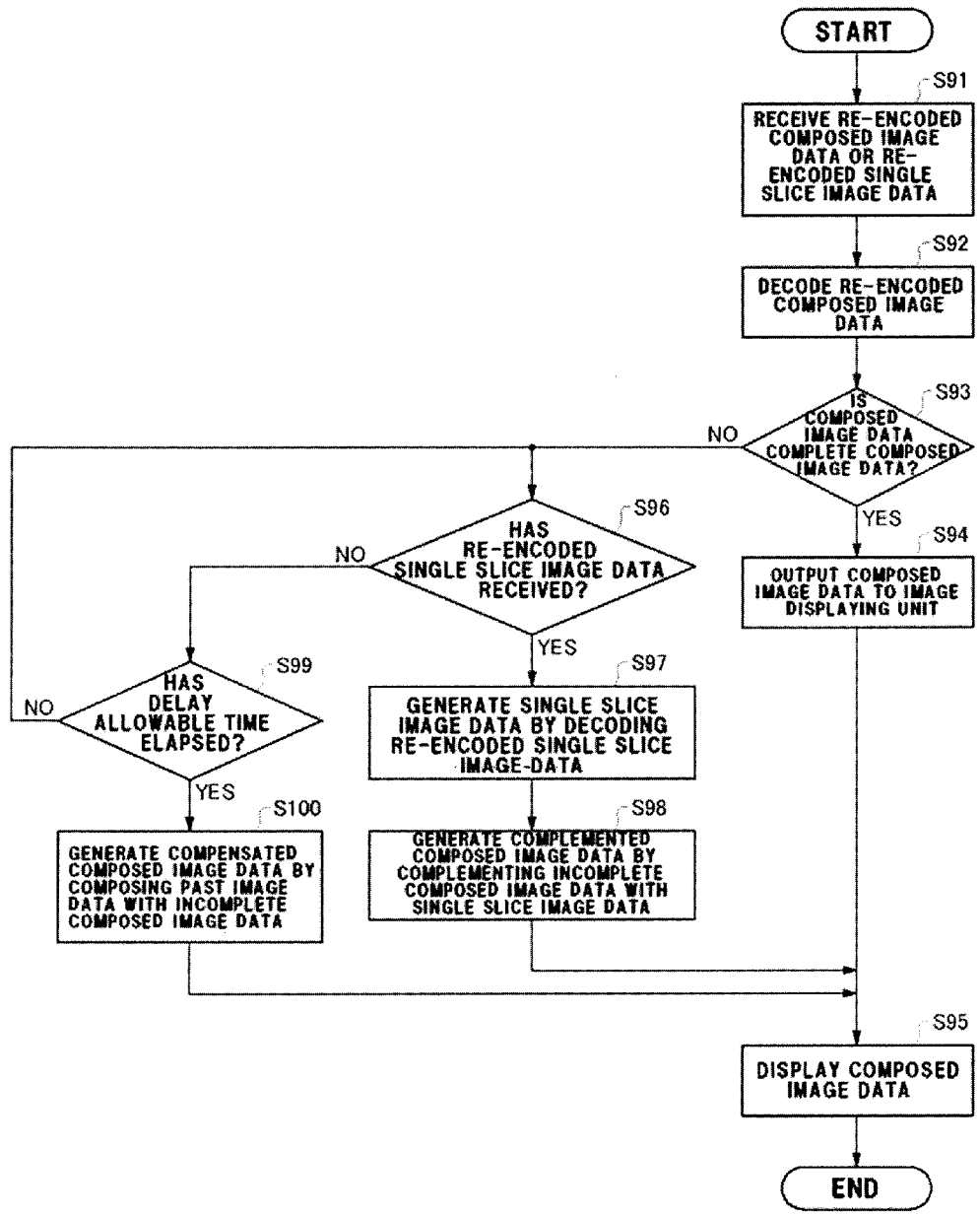
FIG. 9 is a flowchart that illustrates the operation of an image display apparatus according to an embodiment.
Figure 10:
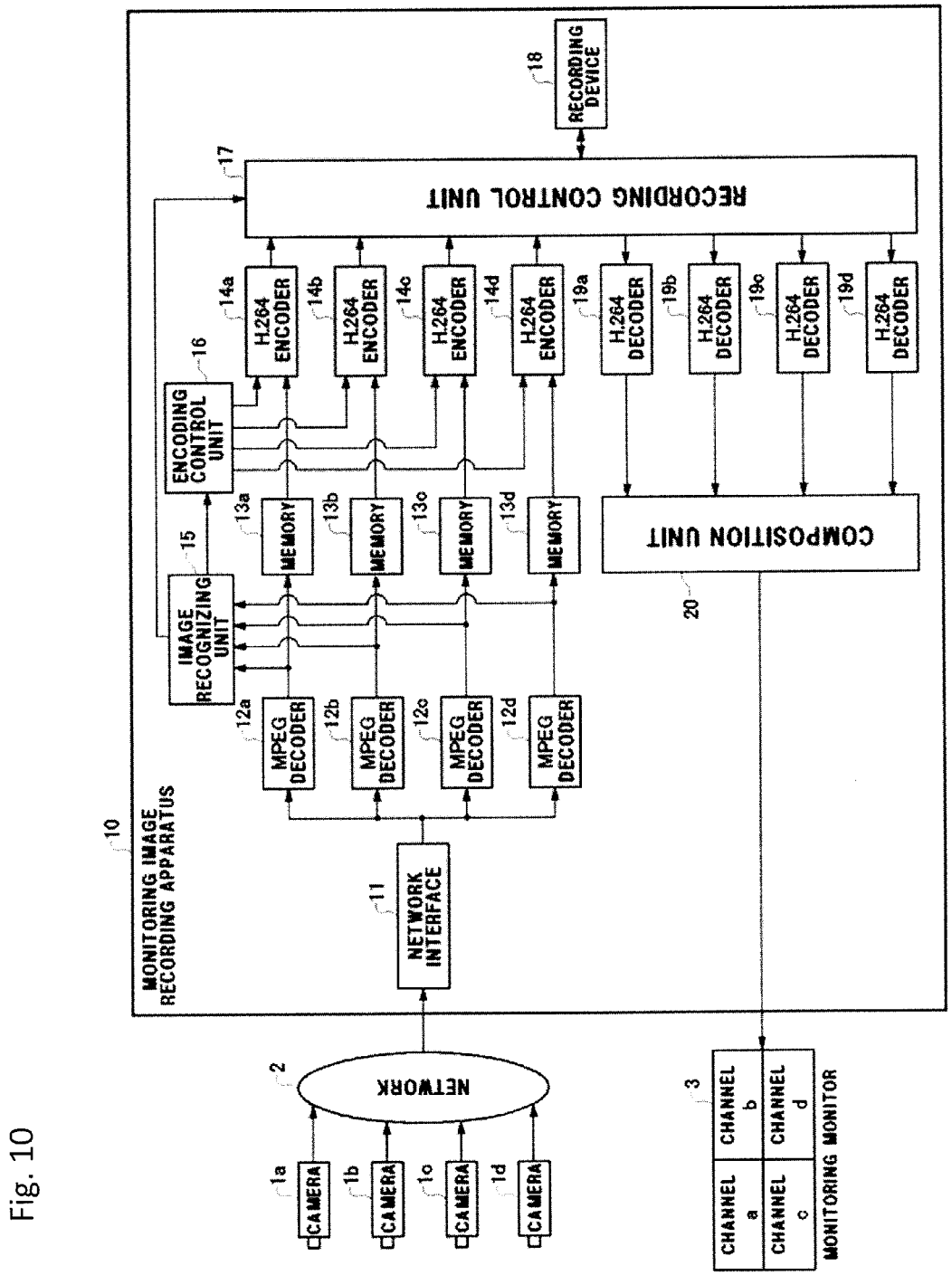
FIG. 10 is a block diagram that illustrates the configuration of a conventional monitoring image recording apparatus.
Figure 11A:
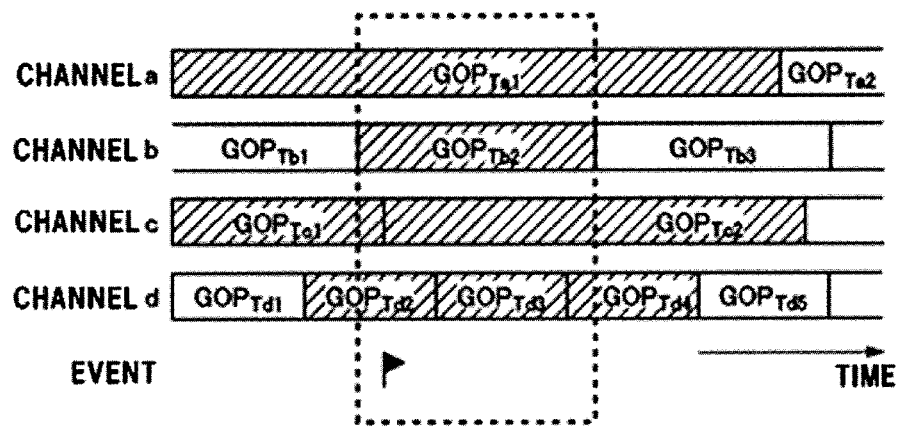
FIG. 11A is a diagram that illustrates the configuration of encoded streams of respective channels in a case where the sizes and the start positions of conventional GOPs are not uniformized.
Figure 11B:
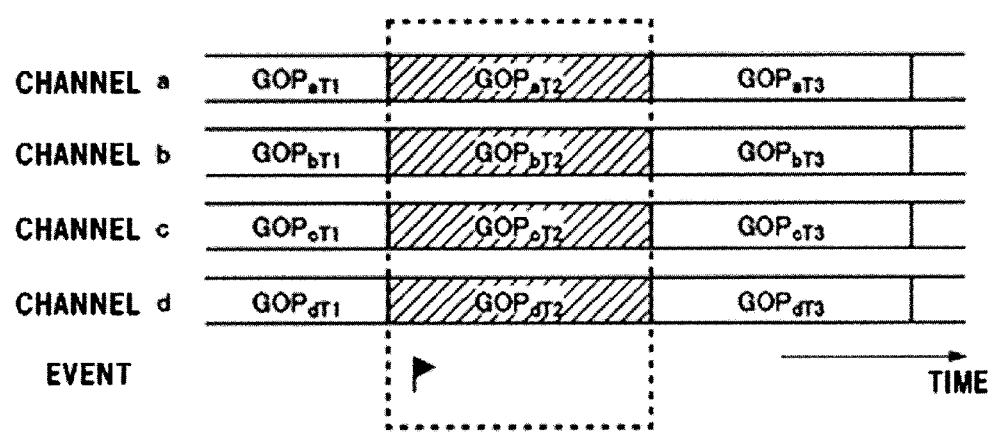
FIG. 11B is a diagram that illustrates the configuration of encoded streams of respective channels in a case where the sizes and the start positions of conventional GOPs are uniformized.

Next, the operation of the image display apparatus 30 will be described. FIG. 9 is a flowchart that illustrates the operation of the image display apparatus 30. In the image display apparatus 30, first, the reception unit 301 receives re-encoded composed image data when the re-encoded composed image data is received from the image composing and re-encoding apparatus 20 and receives re-encoded single slice image data when the re-encoded single slice image data is received from the image composing and re-encoding apparatus 20 in Step S91. The composed image decoding unit 302 generates composed image data by decoding the re-encoded composed image data in Step S92. The composed image decoding unit 302 determines whether the decoded composed image data is complete composed image data in which a slice is not absent or not (incomplete composed image data in which a part of slices is absent) based on the image decoding data transmitted from the image encoding information storing unit 306 in Step S93. In a case where the composed image data is the complete composed image data (Yes in Step S93), the composed image data is output to the image displaying unit 308 in Step S94. The image displaying unit 308 displays the input composed image data in Step S95.

On the other hand, in a case where the composed image data is incomplete composed image data in which a part of slices is absent (No in Step S93), it is determined whether or not re-encoded single slice image data is received by the reception unit 301 in Step S96. In a case where the re-encoded single slice image data is received (Yes in Step S96), single slice image data is generated by decoding the re-encoded single slice image data in Step S97, and complemented composed image data is generated by complementing the incomplete composed image data using the single slice image data in Step S98.

In a case where the re-encoded single slice image data is not received (No in Step S96), it is determined whether or not the delay allowable time has elapsed in Step S99. Until the delay allowable time elapses (No in Step S99), the determination (Step S96) whether or not the re-encoded single slice image data is received is repeated. When the delay allowable time elapses (Yes in Step S99) in the state in which the re-encoded single slice image data is not received (not Yes in Step S96), the image complementing and composing unit 304 reads past image data stored in the image storing unit 303 for the slice that is absent in the incomplete composed image data, generates incomplete composed image data by composing the past image data with the incomplete composed image data, and outputs the complemented composed image data to the image displaying unit 308 in Step S100. The image displaying unit 308 displays the input composed image data in Step S95.

As above, while the embodiment has been described, the present technology is not limited thereto. For example, in the above-described embodiment, the composed image data is generated by vertically and horizontally arranging and composing image data transmitted from four cameras, the number of pieces of image data to be composed may be less than or more than four. In addition, the sizes of a plurality of slices may be different from each other.

In addition, since the image composing and re-encoding apparatus 20 according to the above-described embodiment determines whether or not image data is delayed for each of the cameras 10a to 10d in units of streams, it may be configured such that a camera control unit is arranged in the image composing and re-encoding apparatus 20, a camera out of the cameras 10a to 10d for which image data is frequently delayed is specified, and a control signal for lowering the coded rate of the image data is transmitted to such a camera, or the coded rates in the encoding units 102a to 102d may be adjusted when such a control signal is received by the cameras 10a to 10d. In addition, in such a case, in a case where the delay of the image data transmitted from such a camera is small, control may be performed for returning the coded rate to the original coded rate.

In addition, while the image composing unit 204 of the image composing and re-encoding apparatus 20 according to the above-described embodiment generates composed image data that has divided into slices using the image data transmitted from a plurality of cameras, the image composing unit 204 may generate composed image data in which images transmitted from a plurality of cameras are arranged according to another system. In addition, the image composing unit 204 may generate composed image data in which images transmitted from a plurality of cameras partially overlap each other.

While the preferred embodiment of the present technology, which is considered at the current time point, has been described, this embodiment may be variously changed, and all such changes within the true spirit and the scope of the present technology are intended to be included in the attached claims.

The present technology has an advantage of being capable of transmitting composed image data to an image display apparatus without setting a long fluctuation allowable time (or with little fluctuation allowable time) and is useful as an image display system or the like that composes a plurality of images captured by a plurality of imaging apparatuses and displays a composed image using an image display apparatus.

What is claimed is:

1. An image composing and re-encoding apparatus comprising:
   a reception unit that receives encoded image data transmitted from each of a plurality of imaging apparatuses respectively in a wireless manner;
   a decoding unit that decodes each of a plurality of pieces of the encoded image data received by the reception unit;
   an image composing unit that generates composed image data by composing a plurality of pieces of image data decoded by the decoding unit;
   a re-encoding unit that generates re-encoded composed image data by re-encoding the composed image data; and
   a transmission unit that transmits the re-encoded composed image data,
   wherein the image composing unit generates the composed image data in which a part is absent in a case where image data of a part of imaging apparatuses out of the plurality of imaging apparatuses is absent,
   the re-encoding unit generates re-encoded partial image data by re-encoding delayed image data when the absent image data is input with a delay, and
   the transmission unit transmits the re-encoded partial image data.

2. The image composing and re-encoding apparatus according to claim 1, wherein the image composing unit generates the composed image data in which a plurality of pieces of image data of the plurality of imaging apparatuses are divided into slices.

3. The image composing and re-encoding apparatus according to claim 1, wherein the image composing unit generates the composed image data in which the image data of a part of the imaging apparatuses is absent in a case where all the image data of the plurality of imaging apparatuses is not collected within a predetermined fluctuation allowable time.

4. The image composing and re-encoding apparatus according to claim 3, wherein the fluctuation allowable time is set to be changeable.

5. The image composing and re-encoding apparatus according to claim 1, wherein the image composing unit composes a plurality of pieces of image data by reducing each of the plurality of pieces of image data and/or cutting high-frequency components of each of the plurality of pieces of image data based on degrees of importance of each of the plurality of pieces of image data and/or inclusion/no-inclusion of a person in each of the plurality of pieces of image data.

6. The image composing and re-encoding apparatus according to claim 1, wherein the re-encoding unit encodes the composed image data at a coded rate that is based on degrees of importance of each of the plurality of pieces of image data and/or inclusion/no-inclusion of a person in each of the plurality of pieces of image data.

7. The image composing and re-encoding apparatus according to claim 1, wherein the re-encoding unit encodes the composed image data at a coded rate that is based on a transmission state of a network by which the transmission unit of the image composing and re-encoding apparatus transmits the re-encoded composed image data.

8. An image display apparatus comprising:
- a reception unit that receives re-encoded composed image data generated by composing and encoding image data of a plurality of imaging apparatuses and re-encoded partial image data generated by encoding delayed image data;
- a composed image decoding unit that generates composed image data by decoding the re-encoded composed image data;
- a partial image decoding unit that generates partial image data by decoding the re-encoded partial image data;
- an image complementing and composing unit that generates complemented composed image data by composing the composed image data and the partial image data corresponding to an absent part in a case where the composed image data is composed image data in which the part is absent; and
- a display unit that displays the composed image data in which there is no absent part or the complemented composed image data.

9. The image display apparatus according to claim 8, wherein the image complementing and composing unit, in a case where a part is absent in the composed image data and there is no partial image data corresponding to the absent part, generates the complemented composed image data by composing past image data in the absent part of the composed image data.

10. An image display system comprising:
- the image composing and re-encoding apparatus according to claim 1;
- an image display apparatus comprising:
  - a reception unit that receives re-encoded composed image data generated by composing and encoding image data of a plurality of imaging apparatuses and re-encoded partial image data generated by encoding delayed image data;
  - a composed image decoding unit that generates composed image data by decoding the re-encoded composed image data;
  - a partial image decoding unit that generates partial image data by decoding the re-encoded partial image data;
  - an image complementing and composing unit that generates complemented composed image data by composing the composed image data and the partial image data corresponding to an absent part in a case where the composed image data is composed image data in which the part is absent; and
  - a display unit that displays the composed image data in which there is no absent part or the complemented composed image data; and
- a plurality of imaging apparatuses.

11. A method of displaying an image in an image display system that includes a plurality of imaging apparatuses, an image composing and re-encoding apparatus, and an image display apparatus, the method comprising:
- capturing images by using each of the plurality of imaging apparatuses;
- generating encoded image data by encoding the image captured in the capturing of an image by using each of the plurality of imaging apparatuses;
- transmitting the encoded image data in a wireless manner by using each of the plurality of imaging apparatuses;
- receiving a plurality of pieces of the encoded image data transmitted from each of the plurality of imaging apparatuses in a wireless manner by using the image composing and re-encoding apparatus;
- decoding the plurality of pieces of the encoded image data received in the receiving of a plurality of pieces of the encoded image data by using the image composing and re-encoding apparatus;
- generating composed image data in which a part is absent by composing a plurality of pieces of image data decoded in the decoding of the plurality of pieces of the encoded image data in a case where the image data of a part of the imaging apparatuses out of the plurality of imaging apparatuses is absent by using the image composing and re-encoding apparatus;
- generating re-encoded composed image data by re-encoding the composed image data generated in the generating of composed image data by using the image composing and re-encoding apparatus;
- generating re-encoded partial image data by re-encoding delayed image data when the absent image data is input with a delay by using the image composing and re-encoding apparatus;
- transmitting the re-encoded composed image data by using the image composing and re-encoding apparatus;
- transmitting the re-encoded partial image data by using the image composing and re-encoding apparatus;
- receiving the re-encoded composed image data by using the image display apparatus;
- receiving the re-encoded partial image data by using the image display apparatus;
- generating partial image data by decoding the re-encoded partial image data by using the image display apparatus;
- generating complemented composed image data by composing the composed image data and the partial image data corresponding to the absent part by using the image display apparatus; and
- displaying the complemented composed image data generated in the generating of complemented composed image data by using the image display apparatus.

12. A method of composing and re-encoding an image, the method comprising:
- receiving a plurality of peace of encoded image data transmitted from each of a plurality of imaging apparatuses respectively in a wireless manner;
- decoding each of a plurality of pieces of the encoded image data received in the receiving of the plurality of piece of the encoded image data;
- generating composed image data in which a part is absent by composing a plurality of pieces of image data decoded in the decoding of a plurality of pieces of the encoded image data in a case where the image data of a part of the imaging apparatuses out of the plurality of imaging apparatuses is absent;
- generating re-encoded composed image data by re-encoding the composed image data generated in the generating of composed image data;
- generating re-encoded partial image data by re-encoding delayed image data when the absent image data is input with a delay;
- transmitting the re-encoded composed image data; and
- transmitting the re-encoded partial image data.

13. A computer-readable storage medium having stored therein an image composing and re-encoding program allowing a computer to serve as:

a reception unit that receives a plurality of pieces of encoded image data transmitted from each of a plurality of imaging apparatuses respectively in a wireless manner;

a decoding unit that decodes each of the plurality of encoded image data received by the reception unit;

an image composing unit that generates composed image data by composing a plurality of pieces of image data decoded by the decoding unit;

a re-encoding unit that generates re-encoded composed image data by re-encoding the composed image data; and a transmission unit that transmits the re-encoded composed image data, wherein the image composing unit generates the composed image data in which a part is absent in a case where the image data of a part of imaging apparatuses out of the plurality of imaging apparatuses is absent, the re-encoding unit generates re-encoded partial image data by re-encoding delayed image data when the absent image data is input with a delay, and the transmission unit transmits the re-encoded partial image data.

14. An image display system comprising:

the image composing and re-encoding apparatus according to claim 1;

an image display apparatus comprising:

a reception unit that receives re-encoded composed image data generated by composing and encoding image data of a plurality of imaging apparatuses and re-encoded partial image data generated by encoding delayed image data;

a composed image decoding unit that generates composed image data by decoding the re-encoded composed image data;

a partial image decoding unit that generates partial image data by decoding the re-encoded partial image data;

an image complementing and composing unit that generates complemented composed image data by composing the composed image data and the partial image data corresponding to an absent part in a case where the composed image data is composed image data in which the part is absent;

wherein the image complementing and composing unit, in a case where a part is absent in the composed image data and there is no partial image data corresponding to the absent part, generates the complemented composed image data by composing past image data in the absent part of the composed image data; and a display unit that displays the composed image data in which there is no absent part or the complemented composed image data; and a plurality of imaging apparatuses.

* * * * *